(12) United States Patent
Jhingran et al.

(10) Patent No.: US 10,255,300 B1
(45) Date of Patent: Apr. 9, 2019

(54) AUTOMATICALLY EXTRACTING PROFILE FEATURE ATTRIBUTE DATA FROM EVENT DATA

(71) Applicant: Google LLC, Mountain View, CA (US)

(72) Inventors: Anant Deep Jhingran, San Jose, CA (US); Krishna Kumar Kesavan, Fremont, CA (US); Joy Aloysius Thomas, Cupertion, CA (US); Jagdish Chand, Fremont, CA (US); Sridhar Rajagopalan, Liverpool (GB)

(73) Assignee: Google LLC, Mountain View, CA (US)

(*) Notice: Subject to any disclaimer, the term of this patent is extended or adjusted under 35 U.S.C. 154(b) by 403 days.

(21) Appl. No.: 14/712,498

(22) Filed: May 14, 2015

(51) Int. Cl.
*G06F 17/30* (2006.01)

(52) U.S. Cl.
CPC .............. *G06F 17/30289* (2013.01)

(58) Field of Classification Search
CPC ......... G06F 17/30684; G06F 17/30536; G06F 17/30327; G06F 17/30699; G06F 17/30038; G06F 17/30321; G06F 17/30598
See application file for complete search history.

(56) References Cited

U.S. PATENT DOCUMENTS

| | | | |
|---|---|---|---|
| 7,426,507 B1* | 9/2008 | Patterson | G06F 17/30616 |
| 7,711,679 B2* | 5/2010 | Patterson | G06F 17/30864 704/4 |
| 7,827,170 B1* | 11/2010 | Horling | G06F 17/30867 707/722 |
| 8,676,626 B1* | 3/2014 | Vance | G06Q 10/109 705/7.16 |
| 8,782,077 B1* | 7/2014 | Rowley | G06F 17/30864 707/769 |
| 8,924,993 B1* | 12/2014 | Niebles Duque | G06F 17/30781 725/9 |
| 2005/0192992 A1* | 9/2005 | Reed | G06Q 10/107 |
| 2009/0070312 A1* | 3/2009 | Patterson | G06F 17/30616 |
| 2013/0117272 A1* | 5/2013 | Barga | G06F 17/30551 707/741 |
| 2014/0074610 A1* | 3/2014 | Bilange | G06Q 50/01 705/14.58 |
| 2014/0331165 A1* | 11/2014 | Fang | G06F 17/212 715/772 |
| 2015/0052128 A1* | 2/2015 | Sharifi | G06Q 30/0631 707/727 |

(Continued)

OTHER PUBLICATIONS

Dudik et al. "Reconstruction from subsequences." Journal of Combinatorial Theory, Series A 103.2 (2003): 337-348.

*Primary Examiner* — Daniel A Kuddus
(74) *Attorney, Agent, or Firm* — Fish & Richardson P.C.

(57) ABSTRACT

Automatically extracting profile feature attribute data from event data is disclosed, including: receiving a set of event data; receiving a feature associated with a profiling technique; determining that a plurality of events associated with a user in the set of event data corresponds to a first attribute corresponding to the feature, wherein the first attribute corresponds to a first bin having a first defined value; determining that the plurality of events associated with the user in the set of event data corresponds to a second attribute corresponding to the feature, wherein the second attribute corresponds to a second bin having a second defined value; and creating a user record corresponding to the user indicating presence in the first bin and the second bin.

17 Claims, 15 Drawing Sheets

Feature: How much money did the user spend at the Acme Store in the last month?

| | $10 | $20 | $30 | $40 | |
|---|---|---|---|---|---|
| User A | 0 | 1 | 0 | 0 | 1102 |
| User A | 0 | 1 | 0 | 0 | 1104 |
| User A | 0 | 0 | 1 | 0 | 1106 |
| User B | 0 | 0 | 0 | 1 | 1108 |
| User B | 0 | 0 | 1 | 0 | 1110 |

(56) References Cited

U.S. PATENT DOCUMENTS

2016/0148255 A1\* 5/2016 Shariat ............... G06Q 30/0255
　　　　　　　　　　　　　　　　　　　　　　　705/14.53
2016/0328748 A1\* 11/2016 Koran ................ G06Q 30/0269

\* cited by examiner

Feature: How long ago since the user purchased an item from the Acme Store?

|        | 1 week | 2 weeks | 3 weeks | 4 weeks |
|--------|--------|---------|---------|---------|
| User A | 0      | 0.5     | 0.5     | 0       |
| User B | 0.5    | 0.5     | 0       | 0       |

FIG. 9

Feature: How much money did the user spend at the Acme Store in the last month?

|        | $10 | $20 | $30 | $40 |
|--------|-----|-----|-----|-----|
| User A | 0   | 1   | 0   | 0   | ← 1102
| User A | 0   | 1   | 0   | 0   | ← 1104
| User A | 0   | 0   | 1   | 0   | ← 1106
| User B | 0   | 0   | 0   | 1   | ← 1108
| User B | 0   | 0   | 1   | 0   | ← 1110

FIG. 11

Feature: What percentage of the user's total spending last month was on mortgage?

|        | 25% | 25% | 25% | 25% |
|--------|-----|-----|-----|-----|
| User A | 1   | 1   | 0   | 0   |
| User B | 1   | 1   | 1   | 0   |

FIG. 13

AUTOMATICALLY EXTRACTING PROFILE FEATURE ATTRIBUTE DATA FROM EVENT DATA

BACKGROUND OF THE INVENTION

Conventionally, attribute data is manually extracted by users out of a collected set of event data. For example, a user such as a data scientist can manually establish attributes of quantized values and determine how to organize the collected data to correspond to the attributes. However, manually extracting attribute data from collected event data is inefficient as well as laborious.

BRIEF DESCRIPTION OF THE DRAWINGS

Various embodiments of the invention are disclosed in the following detailed description and the accompanying drawings.

FIG. 9 is a diagram showing an example of applying process 800 of FIG. 8.

FIG. 11 is a diagram showing an example of applying process 1000 of FIG. 10.

FIG. 13 is a diagram showing an example of applying process 1200 of FIG. 12.

DETAILED DESCRIPTION

Figure 1:
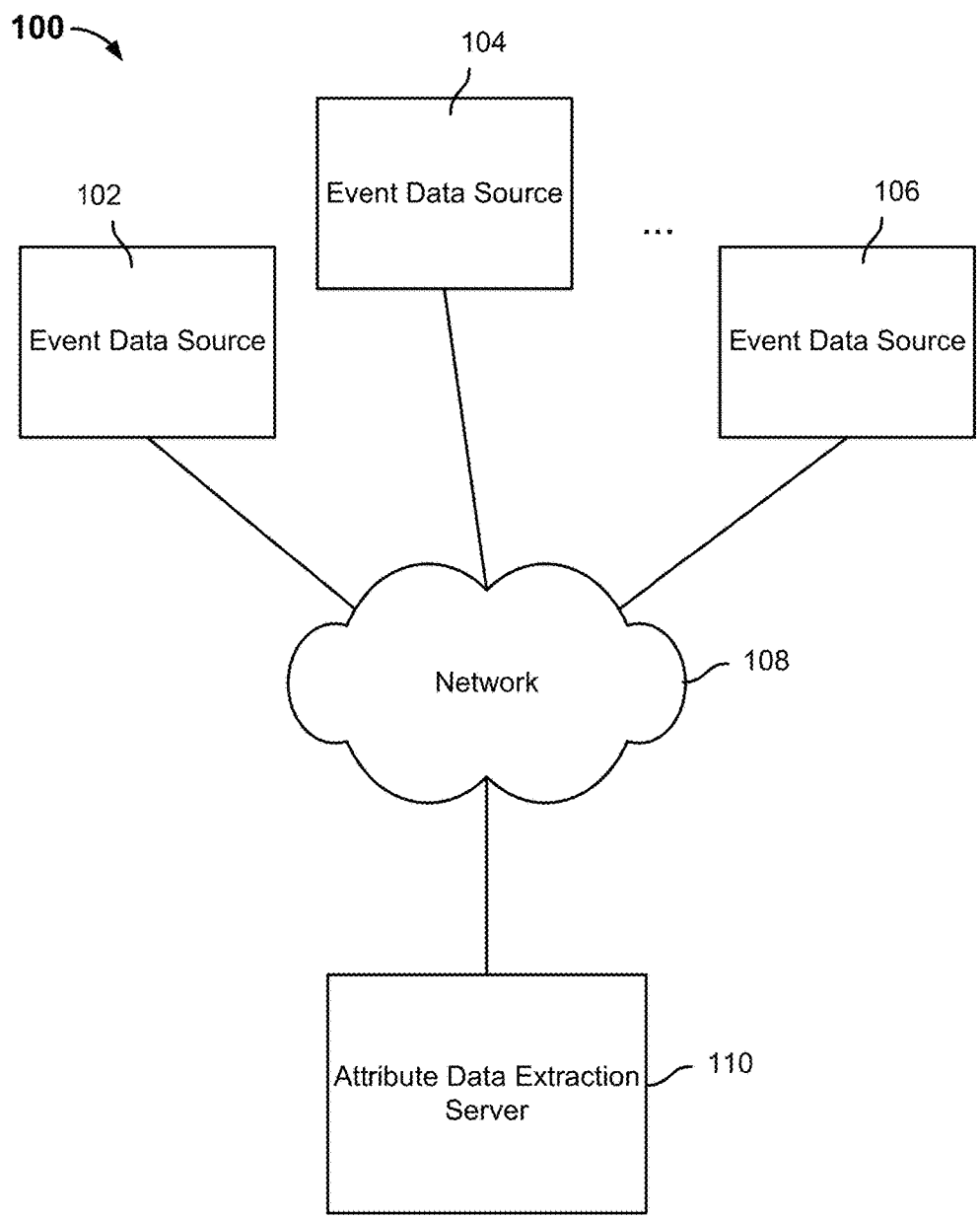
FIG. 1 is a diagram showing an embodiment of a system for automatically extracting profile feature attribute data from event data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of automatically extracting profile feature attribute data from event data are described herein. In various embodiments, event data from one or more sources is collected. In some embodiments, a feature associated with a profiling technique is received. In some embodiments, events associated with a user from the collected set of event data are determined to correspond to at least a first attribute and a second attribute associated with the feature. Each attribute is associated with a corresponding bin of a defined value. In some embodiments, a user record is created for the user that indicates presence in at least the two bins corresponding to the first attribute and the second attribute.

In some embodiments, sequences of a predetermined number of events are extracted from the collected set of event data. In some embodiments, a subset of the plurality of sequences of the predetermined number of events that each meets a threshold number of occurrences is determined. Sequences of the subset of the plurality of sequences of the predetermined number of events are compared to a profiling technique to determine whether the sequences are to be used as attribute data.

FIG. 1 is a diagram showing an embodiment of a system for automatically extracting profile feature attribute data from event data. In the example, system 100 includes event data source 102, event data source 104, event data source 106, network 108, and attribute data extraction server 110. Network 108 includes high-speed data networks and/or telecommunications networks.

Each of the event data source 102, event data source 104, and event data source 106 comprises a server that is associated with collecting and storing event data associated with one or more users. In various embodiments, "event data" comprises user action data with temporal aspects. For example, event data may include a sequence of user actions by a user, where each user action comprises a user interaction with an application, a website, an online service, or a physical business. Examples of user actions include a user sending an email, a user interaction with a social media website, a user interaction with an application executing at a client device, and a user making a product purchase at an online store.

Attribute data extraction server 110 is configured to obtain the event data collected and stored by event data source 102, event data source 104, and event data source 106 directly from event data source 102, event data source 104, and event data source 106 and/or from another entity that has collected event data from event data source 102, event data source 104, and event data source 106. Attribute data extraction server 110 is configured to generate attribute data to input into one or more profiling techniques. In various embodiments, a "profiling technique" comprises a technique that is used to generate user profiles, prediction targets, and/or any other insights from the evaluated attribute data. In some embodiments, a profiling technique may require inputs of attribute data that corresponds to bins of quantized values associated with one or more features. A feature is a variable that is used to represent a characteristic of the input information. Features are selected and defined by designers of a feature extraction and are processed to help decode/classify the input information and distinguish and/or disambiguate the input information. In some embodiments, feature values corresponding to a user that are extracted from the collected event data are converted into user records with values corresponding to one or more attribute bins (which comprise quantized values). In some embodiments, attribute data extracted from the collected event data may comprise sequences of a predetermined number of events corresponding to various users.

As will be described in further detail below, attribute data extraction server 110 is configured to automatically extract attribute data from the collected event data. In some embodiments, automatically extracting attribute data from the collected event data includes determining an appropriate number of attribute bins to establish for a feature and creating, for each user, a record that indicates the user's correspondence to one or more attribute bins. Each attribute bin corresponds to a quantized value but, often, the feature values of a user do not exactly match the quantized value of a single attribute bin and instead correspond to multiple quantized values of respective attribute bins. Conventionally, the feature values of a user may be rounded (or otherwise discretized) to match the nearest quantized value of an attribute bin. However, rounding or otherwise discretizing a user's feature values to conform them to the format required by the profiling techniques causes nuanced user information to be lost and ignored by the profiling techniques. For example, if purchases are counted over the last month (30 days), a purchase that occurred 32 days earlier would not be counted but should have about the same influence as a purchase 28 days in the past, which would be counted. Hence it is important to have a technique that is not influenced too much by the choice of the time interval or the way the counts are binned (quantized). As such, in some embodiments, a user record for a user's feature value is created in the extracted attribute data such that multiple (e.g., neighboring or adjacent) attribute bins are indicated as being associated with the user, instead of rounding or otherwise discretizing the user's feature value to match a single attribute bin. By doing so, event data can be automatically converted into an attribute data format that is both acceptable as input into a profiling technique but also preserves the original feature values corresponding to the users associated with the event data.

In some embodiments, automatically extracting attribute data from the collected event data includes extracting sequences of a predetermined number of events corresponding to various users and determining a subset of the sequences that meet a set of criteria to be attribute data to input into a profiling technique.

Figure 2:
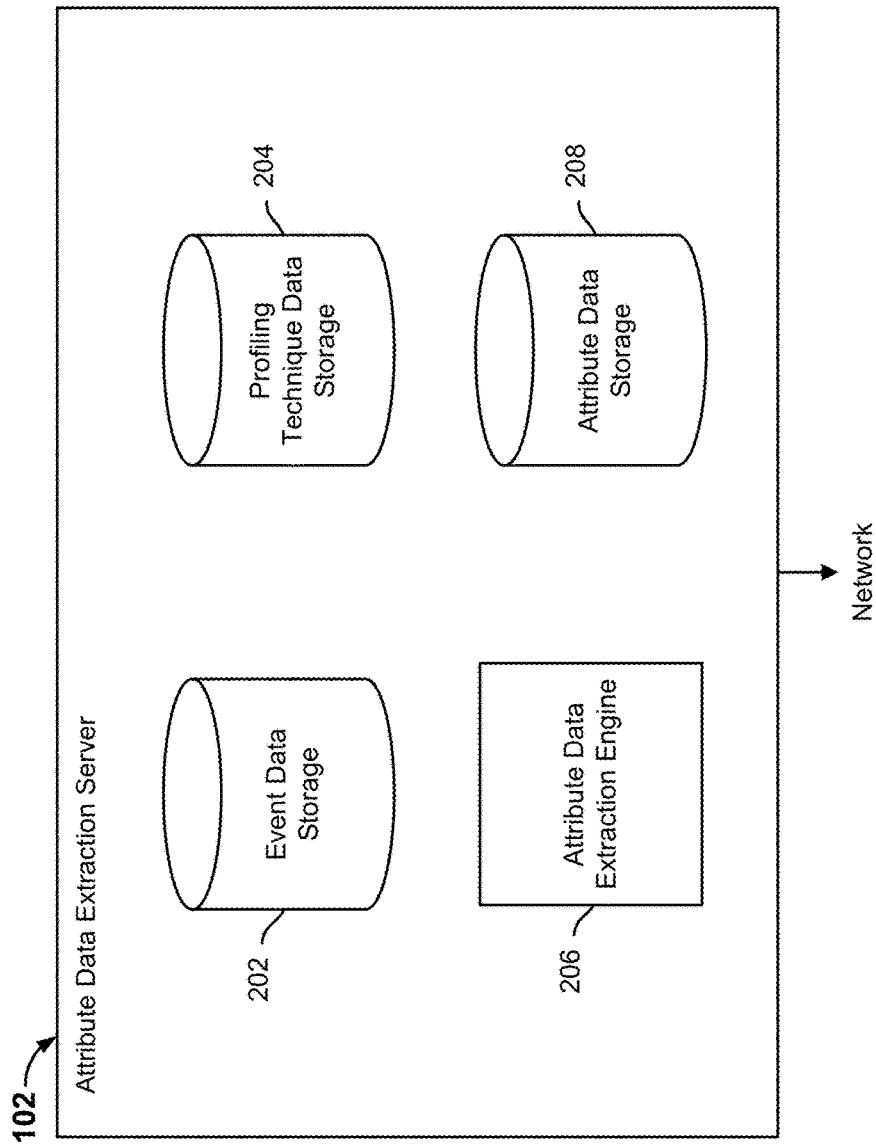
FIG. 2 is a diagram showing an embodiment of an attribute data extraction server.

FIG. 2 is a diagram showing an embodiment of an attribute data extraction server. In some embodiments, attribute data extraction server 110 of system 100 of FIG. 1 is implemented using the example of FIG. 2. In the example, the attribute data extraction server includes event data storage 202, profiling technique data storage 204, attribute data extraction engine 206, and attribute data storage 208. Attribute data extraction engine 206 may be implemented using hardware and/or software.

Event data storage 202 is configured to store event data collected from one or more event data sources. For example, event data sources may include applications, web logs, online store records, physical store records, and/or websites. In various embodiments, event data describes user actions with temporal aspects. For example, event data may describe that on Jan. 15, 2015, User Amy performed user action 1, user action 2, followed by user action 3. In some embodiments, the event data is collected using Hadoop techniques. In some embodiments, the event data is organized in a graph structure.

Profiling technique data storage 204 is configured to store data related to one or more profiling techniques. In some embodiments, profiling technique data storage 204 is configured to store computer code that can be executed to implement one or more profiling techniques. In some embodiments, a profiling technique comprises a machine-learning technique. In some embodiments, profiling technique data storage 204 is configured to store the one or more features for which attribute data is to be extracted and fed into each profiling technique. Examples of features include the number of users that have visited a product page but have not bought the product in the last one month, the number of users that have visited an online store in the last one month, the number of users that have bought something from the online store in the last one month, the number of times that a user performed a specified action in the last one month, and the total cost of a user's total purchases over the last one week. In some embodiments, profiling technique data storage 204 is configured to store one or more types of prediction targets that each profiling technique is configured to generate using the input attribute data. For example, a prediction target that a certain profiling technique is configured to generate is whether a user is likely to purchase a high-end vehicle given the input attribute data of the user's income range.

Attribute data extraction engine 206 is configured to automatically extract attribute data from the event data (e.g., stored at event data storage 202). In some embodiments, attribute data extraction engine 206 is configured to determine a plurality of attributes and a corresponding number of bins for a feature associated with a profiling technique. The attributes of a feature correspond to respective bins of defined, quantized values. Examples of quantized values associated with attributes include aggregate values, ranges, incremental values, and integer values. In some embodiments, attribute data extraction engine 206 is configured to extract a feature value for a user corresponding to a feature and determine that the feature value corresponds to more than one attribute of the feature. For example, the multiple attributes to which a user is associated comprise neighboring or adjacent attributes. In some embodiments, attribute data extraction engine 206 is configured to create a record for the user that indicates the user's correspondence to each of the multiple attributes.

In some embodiments, attribute data extraction engine 206 is configured to extract sequences of predetermined numbers of events from the event data. A sequence of events comprises a series of events that was performed by a user in a temporal/chronological order. In some embodiments, the predetermined number of events per each extracted sequence is three events. In some embodiments, attribute data extraction engine 206 is configured to determine whether the extracted sequences meet a threshold number of sequences. In some embodiments, attribute data extraction engine 206 is configured to collect prediction target data associated with a prediction target of a profiling technique from the set of event data. In some embodiments, attribute data extraction engine 206 is configured to determine a correlation between the extracted sequences that meet a threshold number of sequences and the prediction target of the profiling technique based at least in part on the collected prediction target data.

Attribute data storage 208 is configured to store the attribute data extracted by attribute data extraction engine 206. In some embodiments, the attribute data stored at attribute data storage 208 is configured to be fed into one or more profiling techniques.

Figure 3:
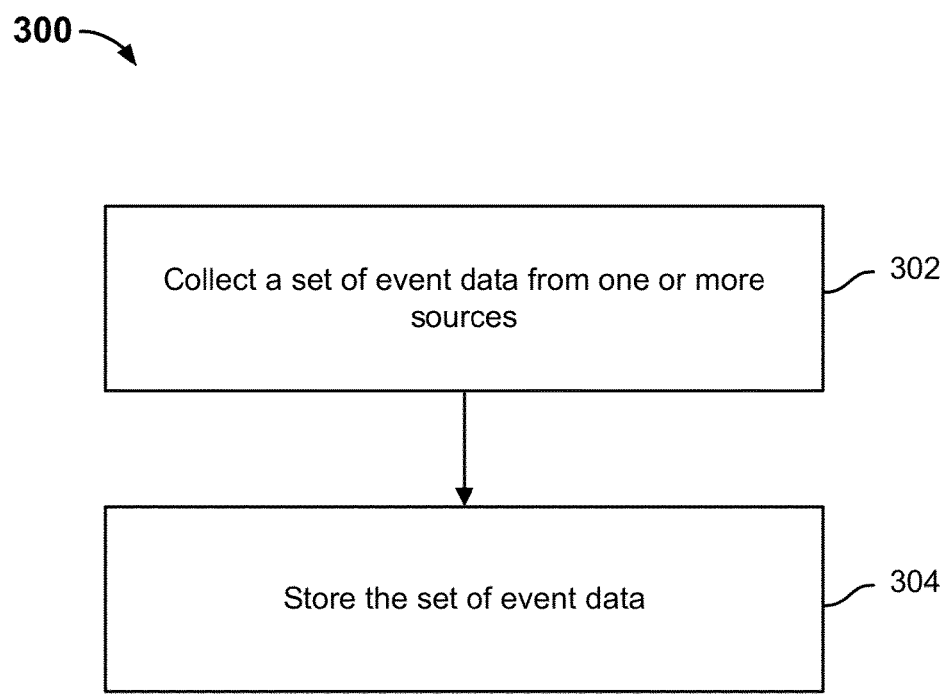
FIG. 3 is a flow diagram showing an embodiment of a process for obtaining event data.

FIG. 3 is a flow diagram showing an embodiment of a process for obtaining event data. In some embodiments, process 300 is implemented at system 100 of FIG. 1. In particular, in some embodiments, process 300 is implemented at attribute data extraction server 110 of system 100 of FIG. 1.

At 302, a set of event data is collected from one or more sources. Event data comprising user actions with temporal aspects (e.g., timestamps and/or chronological sequences) associated with various users is collected from a variety of sources. For example, the event data may include sequences of user actions where each sequence of user actions includes user actions performed by a respective user over a period of time. Example sources of event data include applications, mobile devices, web logs, online stores, physical stores, social media platforms, and websites.

In some embodiments, the event data associated with a particular source is stored at a corresponding server and the event data associated with that source is queried from that server.

At 304, the set of event data is stored. The collected event data is stored. In some embodiments, after event data is collected from multiple sources, the events across the different sources that correspond to the same user are combined in a chronological sequence of user actions across the one or more sources. For example, first, User A's actions of sending an email can be obtained from an email application, User A's actions of posting an update at a social media platform can be obtained from the social media platform, and User A's actions of purchasing a product online can be obtained from an online store. Then, User A's actions obtained from the email application, the social media platform, and the online store can be combined into one or more sequences of user actions based on the timestamp and/or other time associated with the user actions. For example, a created sequence of event data for user A may include User A sending an email to steve@mail.com, followed by User A posting an update at the social media platform, followed by User A buying a set of batteries from the online store.

Figure 4:
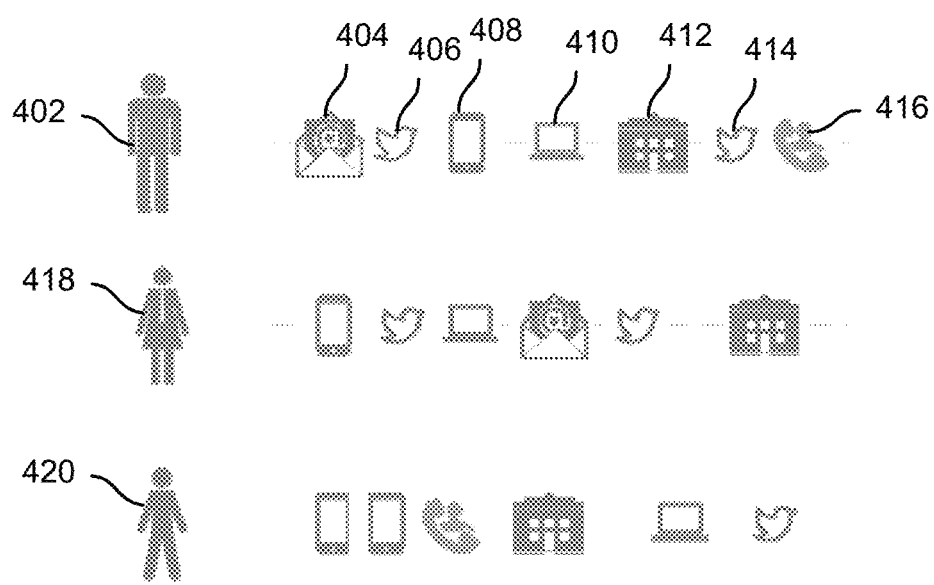
FIG. 4 is a diagram showing the stored sequence of events for various users.

FIG. 4 is a diagram showing the stored sequence of events for various users. As described above, event data corresponding to various users can be obtained from various sources and the events collected from different sources can be combined in a chronological sequence for each user. In the example of FIG. 4, events were collected from six types of sources (an email application, Twitter, mobile devices, desktop computers, a calling application, and an online store) for each of users 402, 418, and 420. In some embodiments, events were separately collected from each of the six types of sources and then events related to the same user were combined into a sequence of events for that user. For example, for user 402, events performed by user 402 were first collected from each of the six types of sources and then combined into the following chronological sequence/order, from earliest to latest performed event: sending an email 404, checking Twitter 406, checking mobile device 408, checking desktop device 410, purchasing an item at an online store 412, checking Twitter 414, and making a phone call 416. Events are similarly obtained and combined for users 418 and 420.

Figure 5:
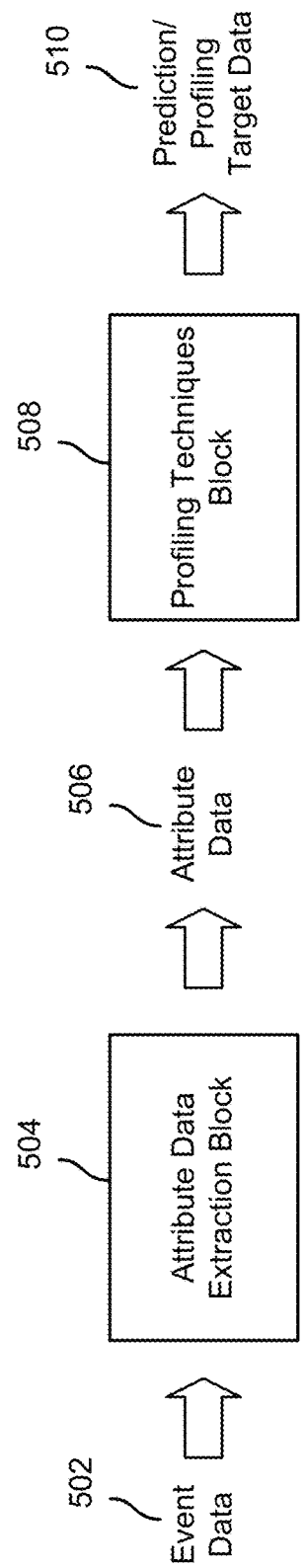
FIG. 5 is a diagram showing an embodiment of processing event data.

FIG. 5 is a diagram showing an embodiment of processing event data. The diagram of FIG. 5 shows a high-level flow of processing event data to eventually generate prediction/profiling data. Event data 502 is input into attribute data extraction block 504. Attribute data extraction block 504 automatically processes input event data 502 to a format that is acceptable/recognized by one or more profiling techniques implemented by input profiling techniques block 508. Various embodiments of implementing attribute data extraction block 504 are described herein. Attribute data extraction block 504 outputs attribute data 506, which is then input into input profiling techniques block 508. Input profiling techniques block 508 processes (e.g., applies machine learning techniques to) attribute data 506 to generate prediction/profiling target data 510. In some embodiments, input profiling techniques block 508 is configured to determine whether attribute data 506 indicates one or more users, represented in attribute data 506, likely to meet a target profile of a certain type of user.

Figure 6:
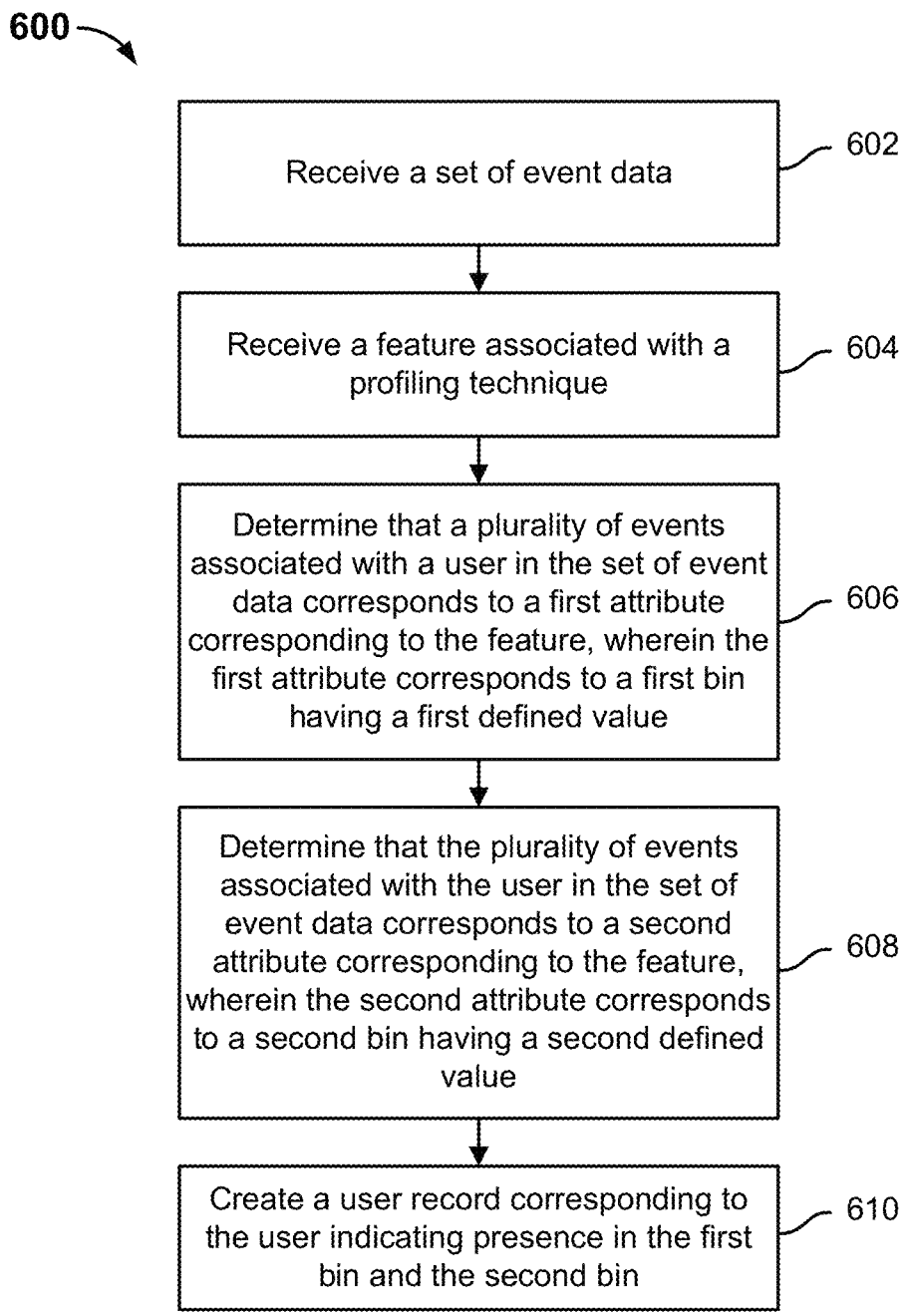
FIG. 6 is a flow diagram showing an embodiment of a process for automatically extracting profile feature attribute data from event data.

FIG. 6 is a flow diagram showing an embodiment of a process for automatically extracting profile feature attribute data from event data. In some embodiments, process 600 is implemented at system 100 of FIG. 1. In particular, in some embodiments, process 600 is implemented by attribute data extraction server 110 of system 100 of FIG. 1. In some embodiments, process 600 is implemented at attribute data extraction block 504 of FIG. 5.

At 602, a set of event data is received. In some embodiments, the set of event data comprises the event data described with process 300 of FIG. 3.

At 604, a feature associated with a profiling technique is received. Since the attribute data to be extracted from the event data is to be fed into a profiling technique, a feature desired by the profiling technique is received. In some embodiments, the feature is used to establish the attributes for which data is to be extracted from the event data. In some embodiments, each attribute comprises a bin of a different defined value corresponding to the feature. Examples of an attribute bin comprise a single value, a range of values, an aggregate value, an incremental value, and a temporal value. In some embodiments, the number of attribute bins to establish for each feature is dynamically determined. In some embodiments, the number of attribute bins to establish for each feature is predetermined. In some embodiments, the number of attribute bins to establish for each feature is a power of two.

For example, if the feature queried the number of times that a user had purchased an item from a certain online store in the last month, then each attribute bin can be an integer number of items or a range of number of items. For example, a first bin can be "1 time," a second bin can be "5 times," and so forth. Because the profiling technique requires a finite number of attribute bins as input, each attribute bin comprises a quantized value of all possible values that correspond to the feature.

At 606, it is determined that a plurality of events associated with a user in the set of event data corresponds to a first attribute corresponding to the feature, wherein the first attribute corresponds to a first bin having a first defined value. In various embodiments, the events associated with a particular user are analyzed to determine that user's feature value that corresponds to the feature. Then, it is determined to which one or more of the attribute bins the user's feature value corresponds.

At 608, it is determined that the plurality of the events associated with the user in the set of event data corresponds to a second attribute corresponding to the feature, wherein the second attribute corresponds to a second bin having a second defined value. Often, without rounding or otherwise discretizing the user's feature value to precisely match the defined value of one bin, the user's feature value corresponds to multiple attribute bins. In some embodiments, such multiple attribute bins to which a user's feature value corresponds comprise adjacent/neighboring attribute bins. For example, the user's feature value may correspond to multiple adjacent/neighboring attribute bins by being a value that is in between the defined values of at least two adjacent/neighboring attribute bins or by being a value that matches the defined values of at least two adjacent/neighboring attribute bins.

For example, for the feature that queried the number of times that a user had purchased an item from a certain online store in the last month, a user had purchased 4 items. However, the closest two adjacent/neighboring attribute bins comprise "1 item" and "5 items," respectively, neither of which matches the user's 4 items exactly. As such, it can be said that the user's events corresponding to the feature (as represented by the user's feature of 4 items) corresponds to both the adjacent/neighboring attribute bins of "1 item" and "5 items."

At 610, a user record corresponding to the user indicating presence in the first bin and the second bin is created. Because the user's feature value corresponds to more than one attribute bin, a user record is created for the user to indicate presence in each of such corresponding attribute bins. In various embodiments, to indicate presence in one or more attribute bins refers to creating an entry row in the attribute data that denotes a presence, relevance, weight, or other value in each of such attribute bins. In some embodiments, the presence indicated for the user in each of such attribute bins is determined based on the degree to which the user is present in that particular attribute bin (e.g., relative to the degree that the user is present in one or more other attribute bins). In some embodiments, one or more entry rows can be created for the user in the attribute data to represent the user's correspondence to the multiple attribute bins.

Figure 8:
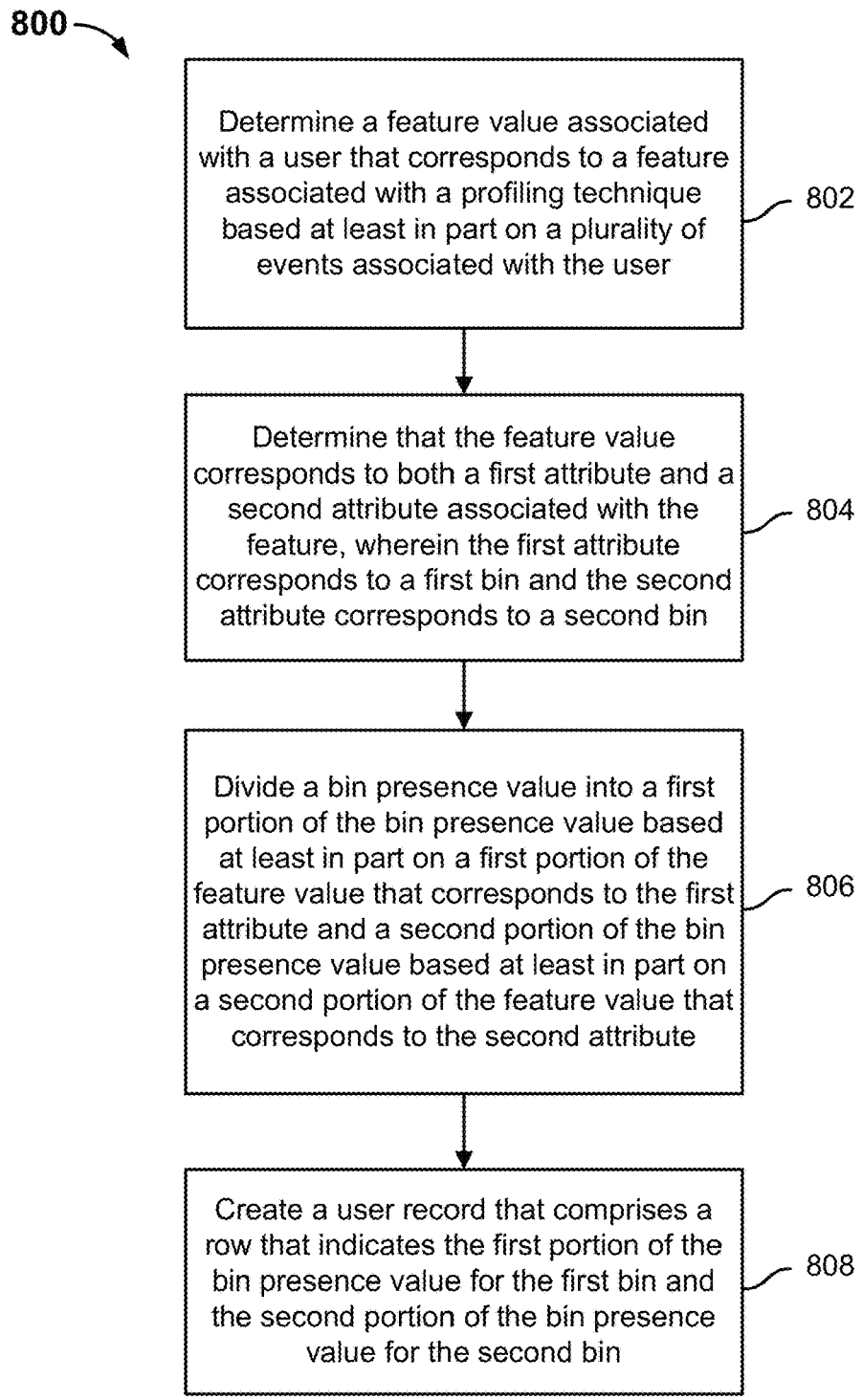
FIG. 8 is a flow diagram showing an example of a process for automatically extracting profile feature attribute data from event data.
Figure 10:
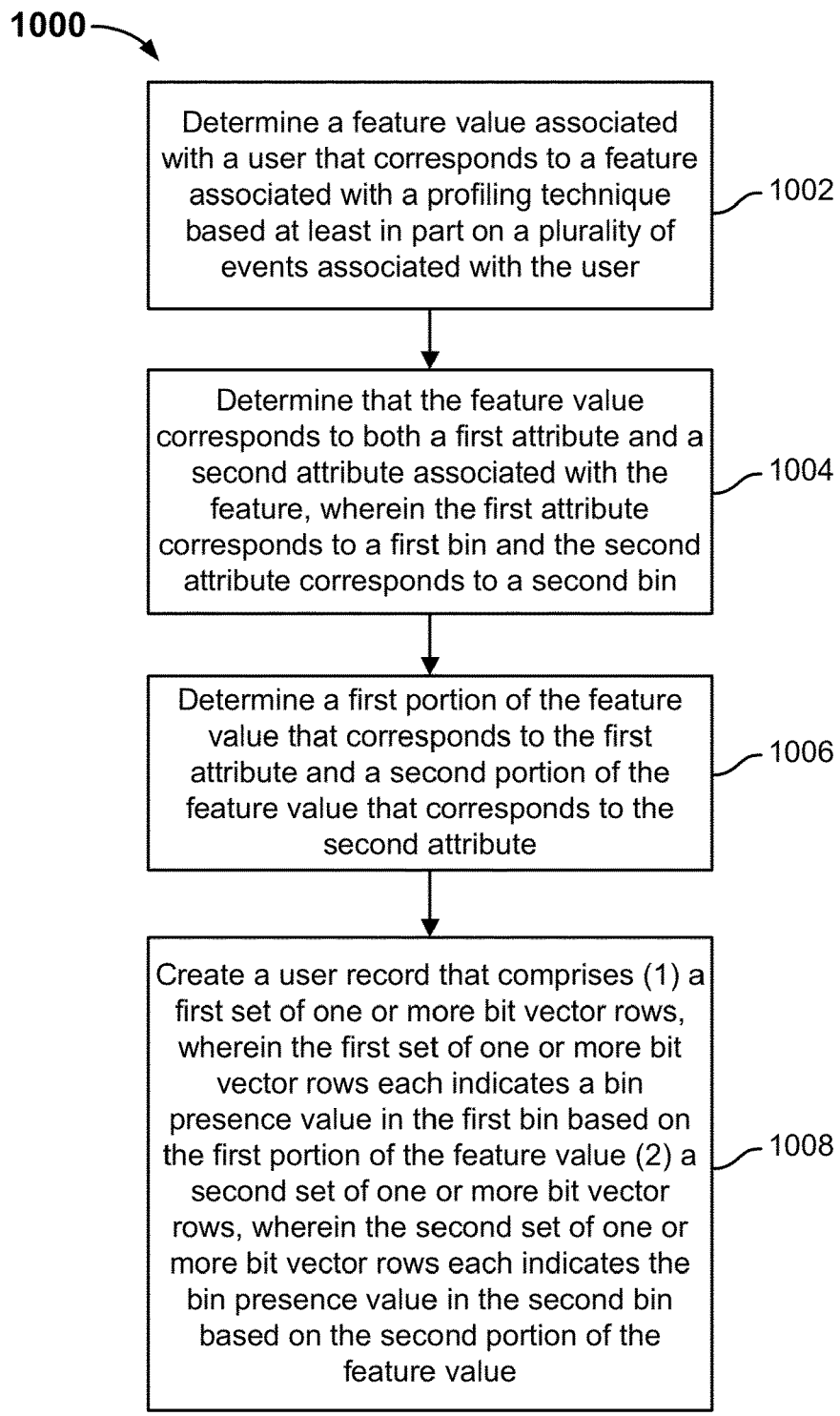
FIG. 10 is a flow diagram showing an example of a process for automatically extracting profile feature attribute data from event data.
Figure 12:
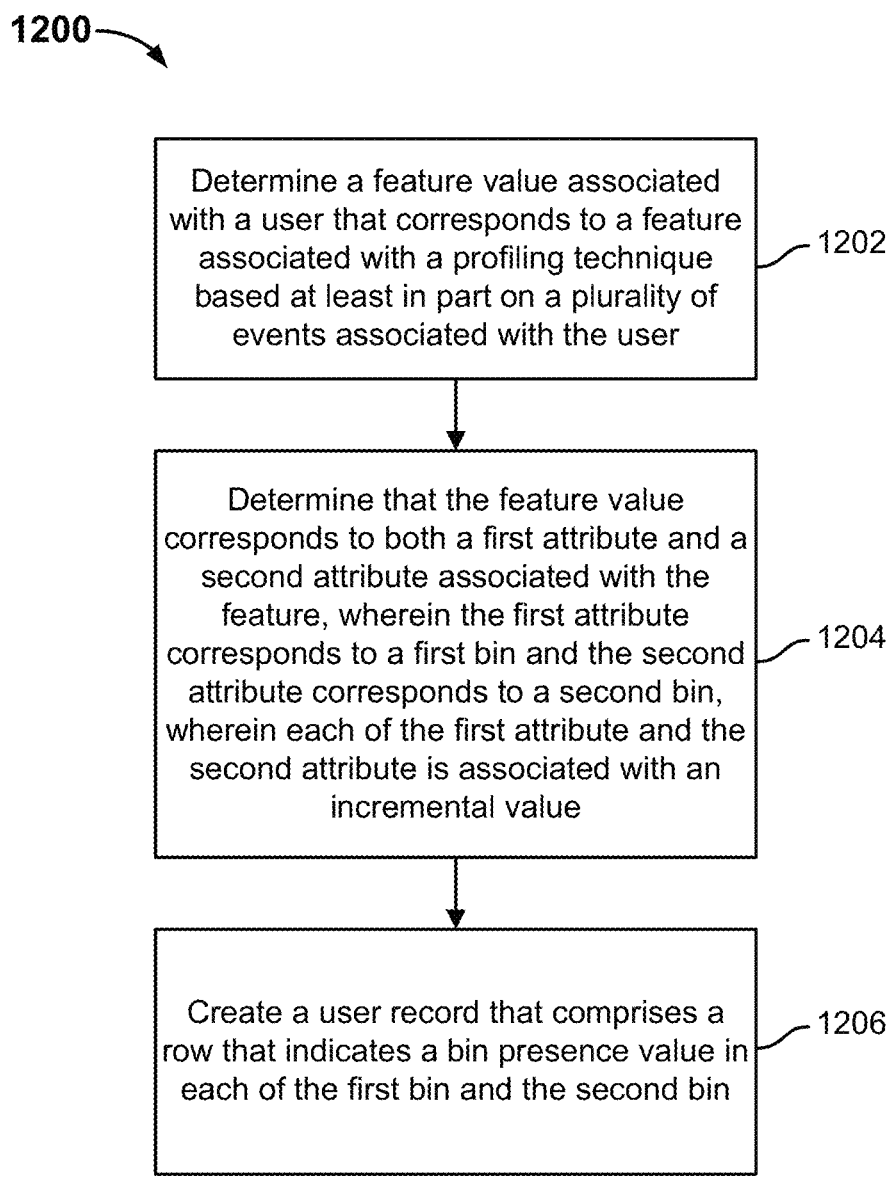
FIG. 12 is a flow diagram showing an example of a process for automatically extracting profile feature attribute data from event data.

Process 600 may be implemented by various alternative techniques. For example, different techniques of implementing process 600 may be used depending on the profiling technique for which attribute data is extracted. FIGS. 8 and 9 below describe a first example technique of implementing process 600. FIGS. 10 and 11 below describe a second example technique of implementing process 600. FIGS. 12 and 13 below describe a third example technique of implementing process 600.

Figure 7:
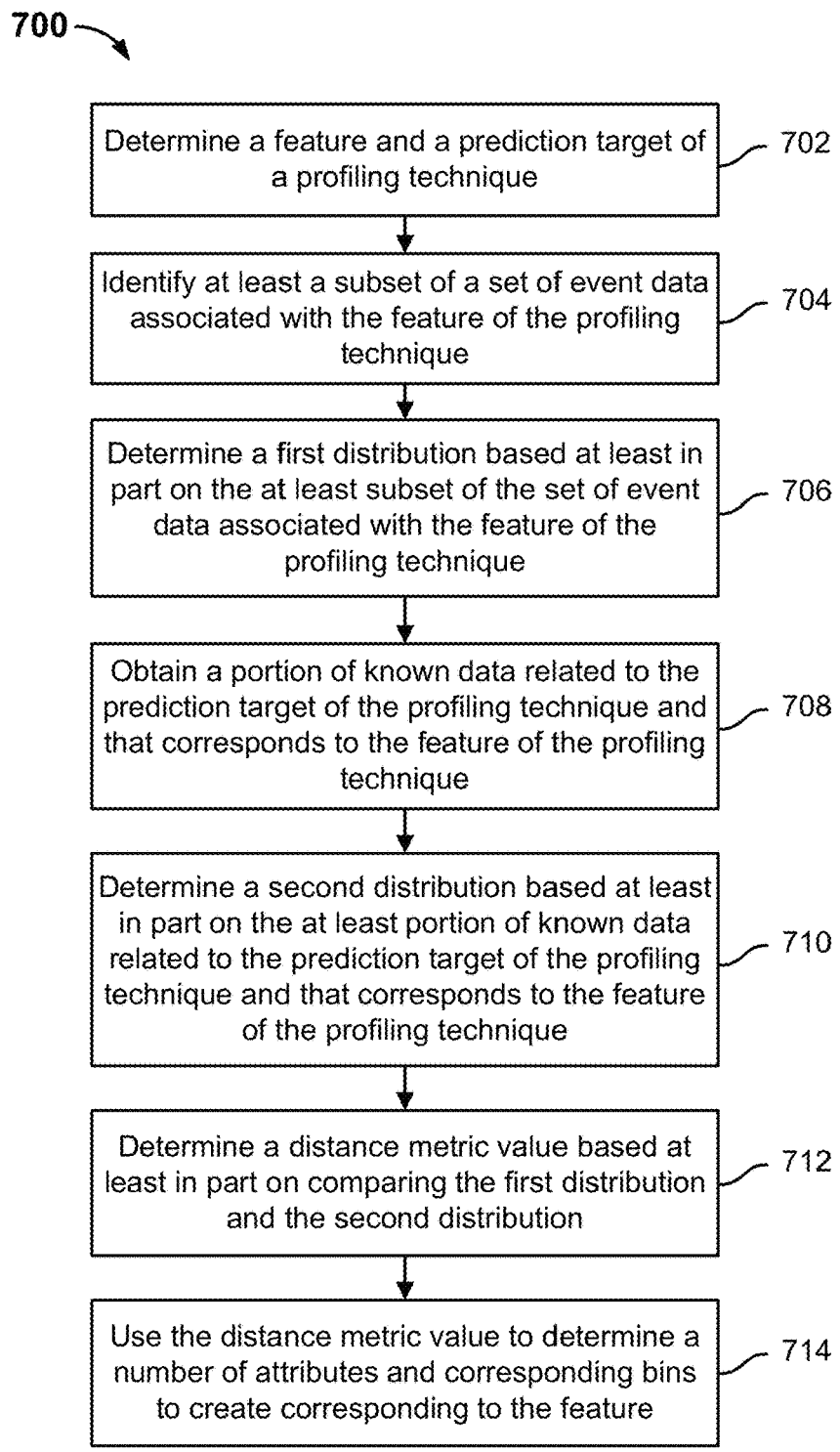
FIG. 7 is a flow diagram showing an embodiment of a process for dynamically determining a number of attributes and corresponding bins to establish for a feature.

FIG. 7 is a flow diagram showing an embodiment of a process for dynamically determining a number of attributes and corresponding bins to establish for a feature. In some embodiments, process 700 is implemented at system 100 of FIG. 1. In particular, in some embodiments, process 700 is implemented by attribute data extraction server 110 of system 100 of FIG. 1. In some embodiments, process 700 is implemented at attribute data extraction block 504 of FIG. 5.

At 702, a feature and a prediction target of a profiling technique are determined. In various embodiments, a feature of a profiling technique describes the type of attribute data to be fed into the profiling technique. In various embodiments, a prediction target of the profiling technique describes the type of prediction data the profiling technique is configured to generate.

At 704, at least a subset of a set of event data associated with the feature of the profiling technique is identified. In some embodiments, the events (associated with one or more users) of a received set of event data related to a feature associated with the profiling technique can be identified. For example, the feature for which attribute data is to be extracted may be "the total amount of money that a user has spent at an online store in the last month" and so events in which users made purchases at the online store in the last month window can be identified from the event data.

At 706, a first distribution is determined based at least in part on the at least subset of the set of event data associated with the feature of the profiling technique. A distribution (e.g., histogram) of "the total amount of money that a user has spent at an online store in the last month" can be determined based on the events that have been identified to correspond to the feature.

At 708, at a portion of known data related to the prediction target of the profiling technique and that corresponds to the feature of the profiling technique is obtained. In some embodiments, known data related to the prediction target sought by a profiling technique is obtained. For example, if the target sought by a profiling technique was "people who are likely to buy high-end sports cars," then known data associated with identified people who have purchased high-end sports cars can be obtained. At least a portion of the known data associated with the prediction target of the profiling technique, identified people who have purchased high-end sports cars, that is also related to the feature of "the total amount of money that a user has spent at an online store in the last month" is identified. Also, for people who have not purchased high-end sports cars, data related to the feature "the total amount of money that a user has spent at an online store in the last month" is also identified.

At 710, a second distribution is determined based at least in part on the at least portion of known data related to the prediction target of the profiling technique and that corresponds to the feature of the profiling technique. A distribution (e.g., histogram) can be determined based on the portion of the known data related to the target and the feature of the profiling technique.

At 712, a distance metric value is determined based at least in part on comparing the first distribution and the second distribution. The distribution determined based on the identified events that corresponds to the feature is compared to the distribution determined based on the portion of the known data that corresponds to the feature and the prediction target of the profiling technique to generate a distance metric value. The distance metric value indicates the degree of similarity between the two distributions and a large distance metric implies that the two distributions are very different from each other, whereas a distance metric close to 0 implies that the distributions are very similar to each other. One example of a distance metric between two distributions is the relative entropy or Kullback-Leibler divergence which is defined as follows:

$$D(P\|Q)=\sum p(x)\log(p(x)/q(x)) \quad (1)$$

At 714, the distance metric value is used to determine a number of attributes and corresponding bins to create corresponding to the feature. In some embodiments, in the event that the distance metric indicates a great (e.g., greater than a threshold) degree of similarity between the two distributions, then it indicates that the event data may be more indicative/useful in identifying the target of "people who are likely to buy high-end sports cars" that is associated with the profiling technique and that more attributes and corresponding bins are to be established in extracting attribute data for the feature. This is because any binning of the attribute values is an approximation and would reduce the ability of the attribute to distinguish between the two distributions. When the two distributions are more similar, using more bins would reduce the information loss, and therefore maintain the ability of the attribute to predict correctly. Otherwise, in some embodiments, in the event that the distance metric value indicates a low (e.g., lower than a threshold) degree of similarity between the two distributions, then it indicates that the event data may be less indicative/useful for identifying the target of "people who are likely to buy high-end sports cars" that is associated with the profiling technique and that fewer attributes and corresponding bins are to be established in extracting attribute data for the feature.

Process 700 describes an example of dynamically determining the number of attribute bins that is to be established for a feature of a profiling technique that may be used in some embodiments. In some other embodiments, the number of attribute bins that is to be established for a feature of a profiling technique is predetermined. Where the number of attribute bins that is to be established for a feature of a profiling technique is predetermined, for example, the four attribute bins may include a "high" bin, a "medium" bin, a "low" bin, and a "zero" bin. For example, each of the "high" bin, "medium" bin, "low" bin, and "zero" bin may be associated with a defined set of one or more values. In some embodiments, regardless of whether the number of attribute bins that is to be established for a feature of a profiling technique is dynamically determined or predetermined, the number of attribute bins is a power of two. The reason for using a power of two number of attribute bins is to have an efficient representation of the bin index. If the number of bins is a power of two (e.g., $2^k$), then the value of the bin index can be efficiently represented with k bits without wasting any bits.

FIG. 8 is a flow diagram showing an example of a process for automatically extracting profile feature attribute data from event data. In some embodiments, process 800 is implemented at system 100 of FIG. 1. In particular, in some embodiments, process 800 is implemented by attribute data extraction server 110 of system 100 of FIG. 1. In some embodiments, process 800 is implemented at attribute data extraction block 504 of FIG. 5. In some embodiments, steps 606, 608, and 610 of process 600 of FIG. 6 are implemented using process 800.

Process 800 describes one example process for automatically extracting profile feature attribute data from event data for a particular user. Process 800 may be repeated for each user for which events are to be included in a set of event data. Process 800 describes a technique of splitting a bin presence value into fractions/portions to indicate presences in multiple attribute bins.

At 802, a feature value associated with a user that corresponds to a feature associated with a profiling technique is determined based at least in part on a plurality of events associated with the user. In some embodiments, the feature is associated with the profiling technique to which the extracted attribute data is to be fed. The feature value of the user can be determined based on evaluating those events associated with the user that correspond to the feature.

At 804, it is determined that the feature value corresponds to both a first attribute and a second attribute associated with the feature, wherein the first attribute corresponds to a first bin and the second attribute corresponds to a second bin. As mentioned above, each bin corresponding to an attribute of a feature comprises a quantized value and often, without rounding or otherwise discretizing, a feature value associated with a user may not match the quantized value of a single attribute bin. Instead, often a feature value associated with a user matches the quantized values of two or more attribute bins. For example, a feature value associated with a user can match the quantized values of two or more attribute bins by falling in between the quantized values of two or more attribute bins. In some embodiments, the two or more attribute bins to which a feature value associated with a user matches comprise adjacent/neighboring bins.

At 806, a bin presence value is divided into a first portion of the bin presence value based at least in part on a first portion of the feature value that corresponds to the first attribute and a second portion of the bin presence value based at least in part on a second portion of the feature value that corresponds to the second attribute. To indicate that a user matches a particular one attribute bin, a value associated with indicating a user's presence, relevance, or association to an attribute bin, sometimes referred to as a "bin presence value," is assigned to that bin for the user. For example, a bin presence value comprises the value of "1" (e.g., which can be represented by 1 bit of information). Conventionally, a user's feature value is rounded or otherwise discretized to match a single attribute bin, then the bin presence value is entirely assigned to that particular one bin. In some embodiments, where the bin presence value may be split into different fractions/portions (e.g., in scenarios in which the profiling technique associated with the feature accepts input values of less than a whole bin presence value for an attribute bin marked for a user or scenarios in which the profiling technique associated with the feature accepts multiple bits of information in an attribute bin marked for a user), the bin presence value may be split into fractions/portions, in which each fraction/portion is to be assigned to an attribute bin to which the user's feature value corresponds. The fraction/portion of the bin presence value that is assigned to each attribute bin that corresponds to the user's feature can be thought of as a weight corresponding to that attribute bin for that user. For example, if the user's feature value corresponds to two attribute bins, then the bin presence value can be split into two fractions/portions.

At 808, a user record that comprises a row that indicates the first portion of the bin presence value for the first bin and the second portion of the bin presence value for the second bin is created. In some embodiments, the attribute data can be represented as a data structure in which attribute bins comprise columns and each user record associated with a user comprises a row that indicates a corresponding fraction/portion of the bin presence value in the corresponding column of each attribute bin with which the user's feature value is associated. In some embodiments, the user's feature value can be recovered as a sum of the products between the defined value of each attribute bin and the fraction/portion of the bin presence value assigned to it.

In some embodiments, process 800 may be used to automatically extract attribute data from event data in scenarios in which the profiling technique associated with the feature accepts input values of less than a whole bin presence value for an attribute bin marked for a user or scenarios in which the profiling technique associated with the feature accepts multiple bits of information in an attribute bin marked for a user.

FIG. 9 is a diagram showing an example of applying process 800 of FIG. 8. In the example of FIG. 9, the feature for which attribute data is extracted is "how long ago since the user purchased an item from the Acme Store?" and four attributes have been established. The four attributes are associated with four bins that include "1 week," "2 weeks," "3 weeks," and "4 weeks." The feature value of User A for the feature of "how long ago since the user purchased an item from the Acme Store?" is 2.5 weeks and the feature value of User B for the feature of "how long ago since the user purchased an item from the Acme Store?" is 1.5 weeks. As such, neither the feature values of User A nor User B matches a single attribute bin. The feature value of User A corresponds to the "2 weeks" and "3 weeks" attribute bins. The feature value of User B corresponds to the "1 week" and "2 weeks" attribute bins. In the example of FIG. 9, assume that the bin presence value of a user is "1." As shown in the example of FIG. 9, in the user record row for User A, the bin presence value of "1" is divided as "0.5" that is indicated in the "2 weeks" attribute bin and as "0.5" that is indicated in the "3 weeks" attribute bin. That way, 0.5 weight can be given to 2 (weeks) and 0.5 weight can be given to 3 (weeks) and the sum of the products between each indicated bin value and its corresponding weight is equal to the feature value of User A (e.g., (0.5*2)+(0.5*3)=2.5). Similarly, in the user record row for User B, the bin presence value of "1" is divided as "0.5" that is indicated in the "1 week" attribute bin and as "0.5" that is indicated in the "2 weeks" attribute bin. That way, 0.5 weight can be given to 1 (week) and 0.5 weight can be given to 2 (weeks) and the sum of the products between each indicated bin value and its corresponding weight is equal to the feature value of User B (e.g., (0.5*1)+(0.5*2)=1.5). As shown in the example of FIG. 9, attribute bins to which a user does not correspond are indicated with a "0."

FIG. 10 is a flow diagram showing an example of a process for automatically extracting profile feature attribute data from event data. In some embodiments, process 1000 is implemented at system 100 of FIG. 1. In particular, in some embodiments, process 1000 is implemented by attribute data extraction server 110 of system 100 of FIG. 1. In some embodiments, process 1000 is implemented at attribute data extraction block 504 of FIG. 5. In some embodiments, steps 606, 608, and 610 of process 600 of FIG. 6 are implemented using process 1000. In some embodiments, process 1000 may be used alternatively to process 800 of FIG. 8.

Process 1000 describes one example process for automatically extracting profile feature attribute data from event data for a particular user. Process 1000 may be repeated for each user for which events are to be included in a set of event data. Process 1000 describes a technique of creating multiple bit vector rows to represent a user's presence in multiple attribute bins.

At 1002, a feature value associated with a user that corresponds to a feature associated with a profiling technique is determined based at least in part on a plurality of events associated with the user.

At 1004, it is determined that the feature value corresponds to both a first attribute and a second attribute associated with the feature, wherein the first attribute corresponds to a first bin and the second attribute corresponds to a second bin.

At 1006, a first portion of the feature value that corresponds to the first attribute and a second portion of the feature value that corresponds to the second attribute are determined. In some embodiments, the attribute data can be represented as a data structure in which attribute bins comprise columns and each user record associated with a user comprises multiple bit vector rows. In some embodiments, where only bit vector rows are acceptable (e.g., in scenarios in which the profiling technique associated with the feature accepts only bit vector rows to indicate attribute presence for a user or scenarios in which the profiling technique associated with the feature does not accept multiple bits of information in an attribute bin marked for a user), multiple bit vector rows may be created for each user record. A bit vector row includes one "1" bit for an attribute bin to which a user corresponds and a "0" bit for each attribute bin to which the user does not correspond. It may be desirable to use bit vector rows to represent each user record because of the presence of very efficient bit counting hardware in the central processing unit (CPU). As such, using bit vector rows allows algorithms using this representation to run much faster than the other representations. Because a bit vector includes only one "1" bit, which can corresponding to only one attribute bin, at a time, multiple bit vectors are needed to be used to represent a user's feature value that corresponds to multiple attribute bins. This way, when the multiple bit vectors that correspond to a user's record are interpreted together, the user's feature value can be recovered. As such, a portion of the user's feature value that corresponds to the quantized value of each corresponding attribute bin is determined.

At 1008, a user record is created that comprises (1) a first set of one or more bit vector rows, wherein the first set of one or more bit vector rows each indicates a bin presence value in the first bin based on the first portion of the feature value and (2) a second set of one or more bit vector rows, wherein the second set of one or more bit vector rows each indicates the bin presence value in the second bin based on the second portion of the feature value. One or more bit vector rows are created for the user to indicate presence in each attribute bin to which the user's feature value corresponds. The total number of "1" bits assigned by the bit vector rows for each corresponding attribute bin relative to the total number of "1" bits assigned by the bit vector rows for all attribute bins should be proportional to the portion of the user's feature value that corresponds to the quantized value of that corresponding attribute bin. As such, the user's feature value can be recovered as the sum of the products between the defined value of each attribute bin and the proportion of assigned "1" bits to it.

FIG. 11 is a diagram showing an example of applying process 1000 of FIG. 10. In the example of FIG. 11, the feature for which attribute data is extracted is "how much money did the user spend at the Acme Store in the last month?" and four attributes have been established. The four attributes are associated with four bins that include "$10," "$20," "$30," and "$40." The feature value of User A for the feature of "how much money did the user spend at the Acme Store in the last month?" is $23.33 and the feature value of User B for the feature of "how much money did the user spend at the Acme Store in the last month?" is $35. As such, neither the feature values of User A nor User B matches a single attribute bin. The feature value of User A corresponds to the "$20" and "$30" attribute bins. The feature of User B corresponds to the "$30" and "$40" attribute bins. In the example of FIG. 11, only bit vector rows are permitted to be used to represent a user's presence in one or more attribute bins. As mentioned above, in various embodiments, each bit vector row includes one "1" bit for an attribute bin to which a user corresponds and a "0" bit for each attribute bin to which the user does not correspond. As such, when a user's feature value is present in multiple attribute bins, multiple bit row vectors are created to represent the degree to which the defined value in each attribute bin contributes to the user's feature value. Therefore, three bit vector rows, including bit vector rows 1102, 1104, and 1106, are created to represent User A's feature value of $23.33. Bit vector rows 1102 and 1104 each includes one "1" bit in the "$20" attribute bin and "0" bits in the remaining attribute bins. Bit vector row 1106 includes a "1" bit in the "$30" attribute bin and "0" bits in the remaining attribute bins. Bit vector rows 1102, 1104, and 1106 can be collectively interpreted as $23.33 because there is a total of two "1" bits in the "$20" attribute bin and a total of "1" bit in the "$30" attribute bin, so the sum of the products between the proportion of assigned "1" bits to its indicated bin value is equal to the feature value of User A (e.g., $[(2/3)*20]+[(1/3)*30]=23.33$). Similarly, two bit vector rows, including bit vector rows 1108 and 1110, are created to represent User B's feature value of $35. Bit vector row 1108 includes one "1" bit in the "$40" attribute bin and "0" bits in the remaining attribute bins. Bit vector row 1110 includes a "1" bit in the "$30" attribute bin and "0" bits in the remaining attribute bins. Bit vector rows 1108 and 1110 can be collectively interpreted as $35 because there is a total of one "1" bit in the "$30" attribute bin and a total of "1" bit in the "$40" attribute bin, so the sum of the products between the proportion of assigned "1" bits to its indicated bin value is equal to the feature value of User B (e.g., $[(1/2)*30]+[(1/2)*40]=35$).

FIG. 12 is a flow diagram showing an example of a process for automatically extracting profile feature attribute data from event data. In some embodiments, process 1200 is implemented at system 100 of FIG. 1. In particular, in some embodiments, process 1200 is implemented by attribute data extraction server 110 of system 100 of FIG. 1. In some embodiments, process 1200 is implemented at attribute data extraction block 504 of FIG. 5. In some embodiments, steps 606, 608, and 610 of process 600 of FIG. 6 are implemented using process 1200. In some embodiments, process 1200 may be used alternatively to process 800 of FIG. 8 and/or process 1000 of FIG. 10.

Process 1200 describes one example process for automatically extracting profile feature attribute data from event data for a particular user. Process 1200 may be repeated for each user for which events are to be included in a set of event data. Process 1200 describes a technique of creating a user record to represent a user's presence in multiple attribute bins, where each attribute bin represents an incremental value over the aggregation of one or more other incremental values.

At 1202, a feature value associated with a user that corresponds to a feature associated with a profiling technique is determined based at least in part on a plurality of events associated with the user.

At 1204, it is determined that the feature value corresponds to both a first attribute and a second attribute associated with the feature, wherein the first attribute corresponds to a first bin and the second attribute corresponds to a second bin, wherein each of the first attribute and the second attribute is associated with an incremental value. In process 1200, the defined value of each corresponding attribute corresponds to an incremental value over the aggregation (e.g., sum) of the defined values of the other one or more attributes. For example, the defined value of each attribute can be equal to each other. For example, attribute bin values can be defined as incremental values when it is desirable to express percentages, in which each attribute bin's defined value would be a certain percentage. In scenarios in which the defined value of each attribute corresponds to an incremental value over the aggregation (e.g., sum) of the defined values of the other one or more attributes, a user's feature value may correspond to multiple attribute bins if the user's feature value was the aggregation (e.g., sum) of the defined values of multiple (adjacent/neighboring) attribute bins.

At 1206, a user record is created that comprises a row that indicates a bin presence value in each of the first bin and the second bin. As mentioned above, to indicate that a user matches a particular one attribute bin, a value associated with indicating a user's presence, relevance, or association to an attribute bin, sometimes referred to as a "bin presence value," is assigned to that bin for the user. For example, a bin presence value comprises the value of "1" (e.g., which can be represented by 1 bit of information). In some embodiments, the attribute data can be represented as a data structure in which attribute bins comprise columns and each user record associated with a user comprises a row that includes a bin presence value in as many adjacent/neighboring attribute bins for which defined values can be aggregated to correspond to the user's feature value.

FIG. 13 is a diagram showing an example of applying process 1200 of FIG. 12. In the example of FIG. 13, the feature for which attribute data is extracted is "what percentage of the user's total spending last month was on mortgage?" and four attributes have been established. The four attributes are associated with four bins that include "25%," "25%," "25%," and "25%." However, unlike the examples of FIGS. 9 and 11, in the example of FIG. 13, each defined value of an attribute bin is an incremental value and to be considered in aggregate with the incremental values of any other attribute bins. The feature value of User A for the feature of "what percentage of the user's total spending last month was on mortgage?" is 50% and the feature value of User B for the feature of "what percentage of the user's total spending last month was on mortgage?" is 75%. As such, neither the feature values of User A nor User B matches a single attribute bin. The feature value of User A corresponds to two "25%" attribute bins. The feature of User B corresponds to three "25%" attribute bins. In the example of FIG. 13, assume that the bin presence value of a user is "1." As shown in the example of FIG. 13, in the user record row for User A, the bin presence value of "1" is indicated in the first two "25%" attribute bins. That way, two 25% values can be added together to represent the feature value of User A (e.g., 25%+25%=50%). Similarly, in the user record row for User B, the bin presence value of "1" is indicated in the first three "25%" attribute bins. That way, three 25% values can be added together to represent the feature value of User A (e.g., 25%+25%+25%=75%).

Figure 14:
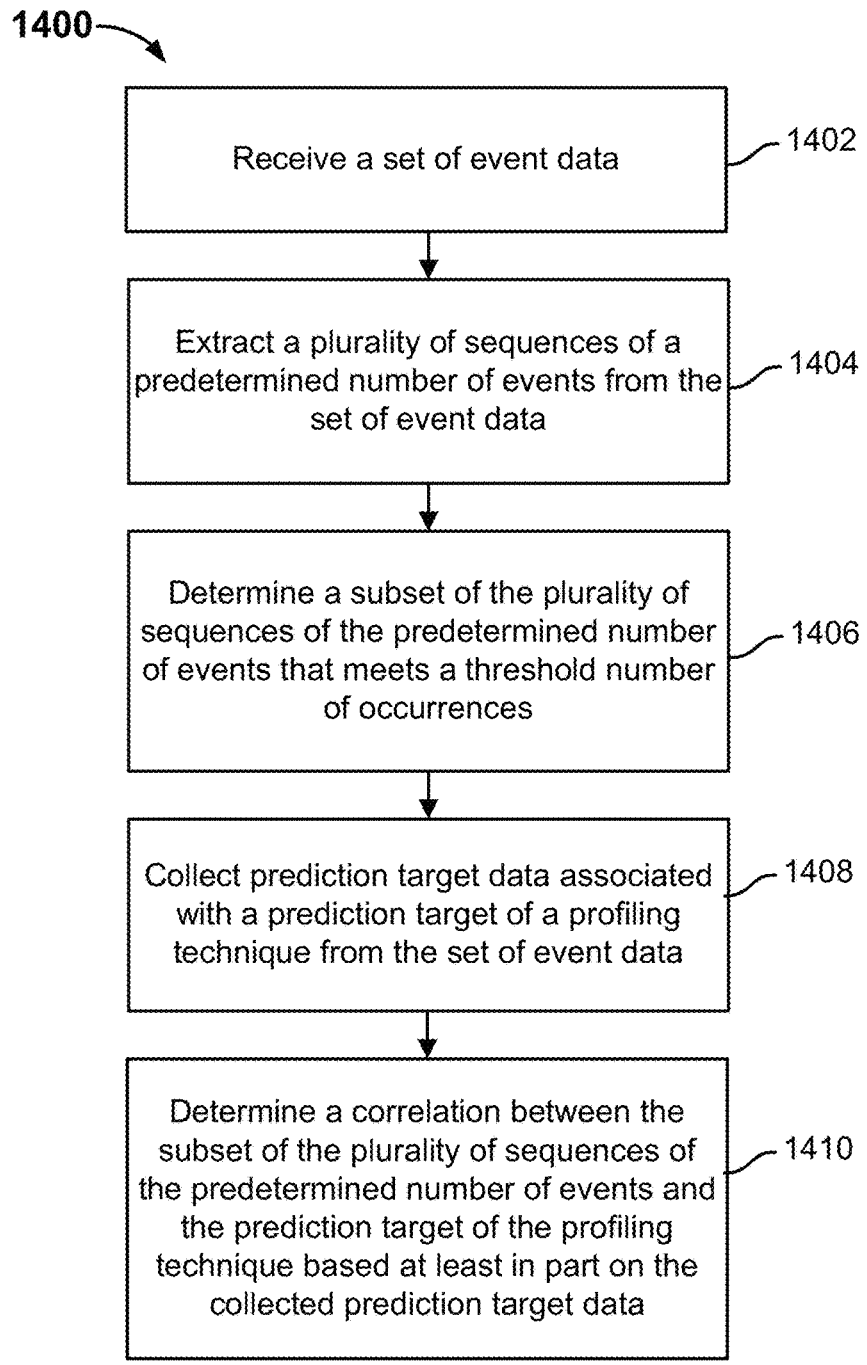
FIG. 14 is a flow diagram showing an embodiment of a process for automatically extracting profile feature attribute data from event data.

FIG. 14 is a flow diagram showing an embodiment of a process for automatically extracting profile feature attribute data from event data. In some embodiments, process 1400 is implemented at system 100 of FIG. 1. In particular, in some embodiments, process 1400 is implemented by attribute data extraction server 110 of system 100 of FIG. 1. In some embodiments, process 1400 is implemented at attribute data extraction block 504 of FIG. 5.

At 1402, a set of event data is received. In some embodiments, the set of event data comprises the event data described with process 300 of FIG. 3.

At 1404, a plurality of sequences of a predetermined number of events is extracted from the set of event data. As mentioned above, the event data includes sequences of events, where each event comprises a user action and a temporal aspect. In various embodiments, all events in a sequence of events are performed by the same user. In various embodiments, a predetermined number of events for each sequence to be extracted is configured by a user or otherwise selected. For example, the predetermined number of events for each sequence to be extracted is three. As such, every instance of a sequence of three events, performed by any user, is extracted from the set of event data. The sequence of three events that is performed by a user is adjacent in time order, i.e., the patterns represent events that occurred one after the other for that user. For example, X, Y, and Z are each an event associated with a different user action and an associated timestamp. A sequence of X, Y, and Z events (where X is performed first, Y is performed second, and Z is performed third) performed by User 1 comprises a first example of an instance of a sequence of three events. A sequence of Y, X, and Z events (where Y is performed first, X is performed second, and Z is performed third) performed by User 1 comprises a second example of a sequence of three events. A sequence of Y, Z, and X events (where Y is performed first, Z is performed second, and X is performed third) performed by User 1 comprises a third example of an instance of a sequence of three events. A sequence of Y, Z, and X events (where Y is performed first, Z is performed second, and X is performed third) performed by User 2 comprises a fourth example of an instance of a sequence of three events.

Instances of the same sequence of events that are performed by various users may be grouped together. The particular sequence of events associated with each group may be referred to, in some embodiments, as a "pattern type." For example, the sequence of events that is formed by events X, Y, and Z is associated with the pattern type of X, Y, and Z events.

At 1406, a subset of the plurality of sequences of the predetermined number of events that meets a threshold number of occurrences is determined. In some embodiments, each group of instances of a sequence of events associated with the same pattern type is compared against a threshold number of occurrences. If the number of instances of the sequence of events associated with the pattern type is equal to or greater than the threshold of occurrences, then the instances of the sequence of events associated with that pattern type are potentially considered to be a set of attribute data. Otherwise, if the number of instances of the sequence of events associated with the pattern type is less than the threshold of occurrences, then the instances of the sequence of events associated with that pattern type are not considered to be a set of attribute data. In some embodiments, a different threshold number of occurrences may be configured for each different pattern type. Checking that the number of instances of a certain pattern type meets a threshold number of occurrences is performed to make sure that the size of the extracted data is significant enough so that the data structures and calculations can be made more efficient. The pattern types that have low number of occurrences are likely to be noisy and would not help much with the prediction.

For example, if the threshold number of occurrences is 1,000 and across various users, there are at least 1,000 extracted instances of the sequence of events associated with the pattern type of X, Y, and Z events, then the pattern type of X, Y, and Z events meets the threshold number of occurrences and will therefore be used as a set of attribute data.

At 1408, prediction target data associated with a prediction target of a profiling technique is collected from the set of event data. Given a profiling technique for which the extracted pattern data is to be used as a set of input attribute data, a prediction target of the profiling technique is determined. As mentioned above, a prediction target is the type of data that is to be output by the profiling technique. For example, a prediction target of a profiling technique can be whether a user will complete a particular transaction. Data in the set of event data that is related to the prediction target of the profiling technique and that had also occurred later in time than the last event of the sequences of events that has been determined to be used as attribute data is identified and extracted from the set of event data.

For example, if a prediction target of a profiling technique is whether a user had purchased a particular item and the pattern type of X, Y, and Z events has been determined to be used as attribute data, then the set of event data is searched for data that indicates whether after users perform instances of X, Y, and Z events, they eventually purchase the particular item. The collected prediction target data of this example may indicate that a user either did or did not purchase the particular item.

At 1410, a correlation is determined between the subset of the plurality of sequences of the predetermined number of events and the prediction target of the profiling technique based at least in part on the collected prediction target data. The extracted instances of the sequence of events associated with a pattern type that is determined to be used as attribute data is compared to the collected prediction target data to determine a correlation between the attribute data and the prediction target of the profiling technique. In various embodiments, the extracted instances of the sequence of events associated with a pattern type that is determined to be used as attribute data are first binned across a predetermined number of bins, where each bin is associated with a range of instances of the sequence of events that is performed by a user, and a separate correlation is determined between each bin and the prediction target of the profiling technique based on the collected prediction target data. The correlation between each bin and the prediction target of the profiling technique indicates the likelihood that a user that belongs to that bin will perform the prediction target, for example. The determined correlation(s) between the extracted instances of the sequence of events associated with a pattern type that is determined to be used as attribute data and the prediction target of the profiling technique can be used to recommend information to a subsequent user who has performed a certain number of instances of the sequence of events associated with a pattern type that is determined to be used as attribute data.

Figure 15:
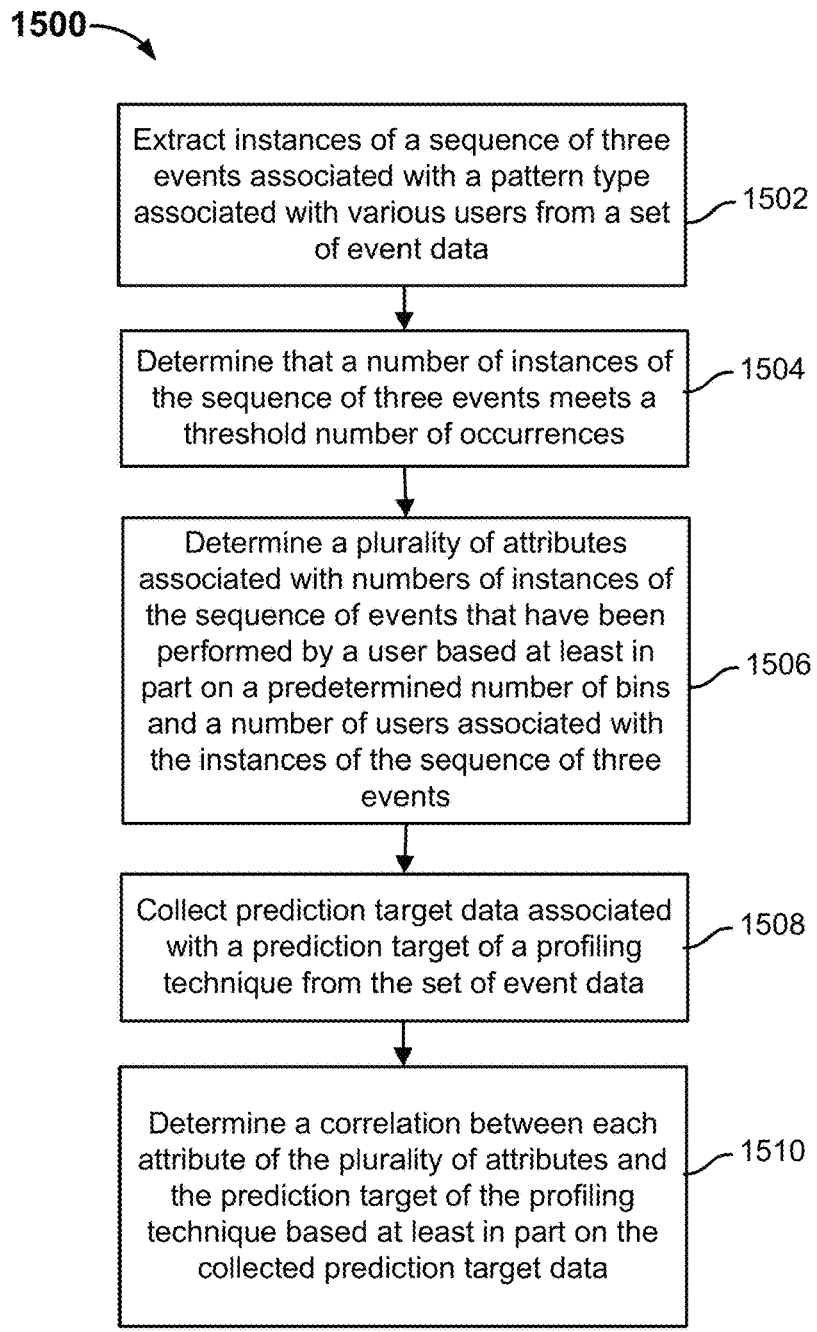
FIG. 15 is a flow diagram showing an example of a process for automatically extracting profile feature attribute data from event data.

FIG. 15 is a flow diagram showing an example of a process for automatically extracting profile feature attribute data from event data. In some embodiments, process 1500 is implemented at system 100 of FIG. 1. In particular, in some embodiments, process 1500 is implemented by attribute data extraction server 110 of system 100 of FIG. 1. In some embodiments, process 1500 is implemented at attribute data extraction block 504 of FIG. 5.

Process 1500 describes a specific example of applying process 1400 of FIG. 14.

At 1502, instances of a sequence of three events associated with a pattern type and associated with various users are extracted from a set of event data. For example, each instance of the sequence of events associated with the pattern type of X, Y, and Z events and that is performed by any user is extracted from a set of event data.

At 1504, a number of the instances of the sequence of three events is determined to meet a threshold of occurrences. In this example, the threshold of occurrences is 1,000. It is determined that 1,400 instances of the sequence of events associated with the pattern type of X, Y, and Z events have been extracted from the set of event data. As such, the pattern type of X, Y, and Z events meets the threshold number of occurrences and is therefore significant enough to be used as attribute data for a profiling technique.

At 1506, a plurality of attributes associated with numbers of instances of the sequence of events that have been performed by a corresponding user is determined based at least in part on a predetermined number of bins and a number of users associated with the instances of the sequence of three events. In this example, three is the predetermined number of bins in which users who have performed the pattern type of X, Y, and Z events will be binned. The bins may be associated with "low," "medium," and "high" users with respect to the number of times that users have performed the pattern type of X, Y, and Z events. It is also predetermined that there should be approximately the same number of users associated with each bin. In this example, the attribute associated with each bin represents a range of the number of instances of the pattern type of X, Y, and Z events that have been performed by each user. Assume that there are 99 users that have each performed various numbers of instances of the pattern type of X, Y, and Z events among the 1,400 extracted instances of the pattern type of X, Y, and Z events. Given that there are three predetermined bins and that approximately the same number of users should belong to each bin, it is determined that 33 users are to belong to each bin. As such, the 99 users are ranked by the number of instances that each user had performed the pattern type of X, Y, and Z events. Then, the first 33 users of the ranked list are analyzed to determine the fewest to the most number instances of the pattern type of X, Y, and Z events that have been performed by a user of that group and a corresponding range is thus determined as the attribute corresponding to the first bin. Similarly, the second 33 users of the ranked list are analyzed to determine the fewest to the most number instances of the pattern type of X, Y, and Z events that have been performed by a user of that group and a corresponding range is thus determined as the attribute corresponding to the second bin. Lastly, the last 33 users of the ranked list are analyzed to determine the fewest to the most number instances of the pattern type of X, Y, and Z events that have been performed by a user of that group and a corresponding range is thus determined as the attribute corresponding to the third bin. For example, the attribute corresponding to the first bin can be 0 to 30 instances, the attribute corresponding to the second bin can be 31 to 60 instances, and the attribute corresponding to the third bin can be 61 to 100 instances.

At 1508, prediction target data associated with a prediction target of a profiling technique is collected from the set of event data. In this example, the prediction target of a profiling technique is whether a user will purchase an ABC brand vehicle. In this example, assume that event X comprises a user performing a search regarding the brand ABC at a search engine, event Y comprises the user selecting a search result that is returned for the search regarding the brand ABC, and event Z comprises the user sending an email to a sales associate with the brand ABC. Therefore, all instances of whether a user did or did not purchase an ABC brand vehicle after the user had sent an email to a sales associate with the brand ABC are searched for in the set of event data.

At 1510, a correlation between each attribute of the plurality of attributes and the prediction target of the profiling technique is determined based at least in part on the collected prediction target data. A correlation that describes the likelihood that a user that belongs to each bin will perform the prediction target is determined. Therefore, in this example, the likelihood that a user who has performed 0 to 30 instances of the pattern type of X, Y, and Z events will purchase an ABC brand vehicle can be determined as a ratio of the number of users who have performed 0 to 30 instances of the pattern type of X, Y, and Z events and purchased an ABC brand vehicle over the total number of users who have performed 0 to 30 instances of the pattern type of X, Y, and Z events. Similarly, the likelihood that a user who has performed 31 to 60 instances of the pattern type of X, Y, and Z events will purchase an ABC brand vehicle can be determined as a ratio of the number of users who have performed 31 to 60 instances of the pattern type of X, Y, and Z events and purchased an ABC brand vehicle over the total number of users who have performed 31 to 60 instances of the pattern type of X, Y, and Z events. Lastly, the likelihood that a user who has performed 61 to 100 instances of the pattern type of X, Y, and Z events will purchase an ABC brand vehicle can be determined as a ratio of the number of users who have performed 61 to 100 instances of the pattern type of X, Y, and Z events and purchased an ABC brand vehicle over the total number of users who have performed 61 to 100 instances of the pattern type of X, Y, and Z events.

The determined correlations between each bin and the prediction target of the profiling technique can be stored and used to recommend information to subsequent users who perform instances of the pattern type of X, Y, and Z events. For example, the bin to which a subsequent user belongs can be determined based on the number of instances of pattern type of X, Y, and Z events that have been performed by the subsequent user. Next, the stored correlation of that bin and the likelihood that the user will purchase an ABC brand vehicle after performing event X is looked up. A pattern score that the user will purchase an ABC brand vehicle after performing event X can be determined based at least in part on the stored correlation. That pattern score may be combined with one or more other scores that have been determined for the user to determine an aggregate score. The user may be ranked among other users based on their respective aggregate scores and the highest ranked users may be sent relevant information (e.g., promotional offers associated with ABC brand vehicles).

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:
one or more computers and one or more storage devices storing instructions that are configured to, when executed by the one or more computers, cause the one or more computers to perform operations comprising:
receiving a set of event data that describe actions of users;
receiving a feature associated with a profiling technique, wherein the feature comprises a variable that represents a characteristic of users in the event data;
obtaining a set of bins that includes the first bin and the second bin;
determining that a numerical value for the feature for a particular user from the set of event data is greater than a first numerical value corresponding to the first bin, is less than a second numerical value corresponding to the second bin, and is not equal to any numerical value corresponding to any bin in the set of bins;
in response to determining that the numerical value of the feature is greater than the first numerical value corresponding to the first bin, is less than the second numerical value corresponding to the second bin, and is not equal to any numerical value corresponding to any bin in the set of bins, determining a first attribute that corresponds to an amount that the numerical value for the feature corresponds to the first numerical value and a second attribute that corresponds to an amount that the numerical value for the feature corresponds to the second numerical value; and
creating a user record corresponding to the user that indicates the first attribute for the first bin and the second attribute for the second bin.

2. The system of claim 1, wherein the set of event data comprises events with temporal aspects.

3. The system of claim 1, wherein the operations further comprise dynamically determining a number of attributes to be established for the feature.

4. The system of claim 1, wherein the feature is associated with a predetermined number of attributes.

5. The system of claim 1, wherein creating a user record corresponding to the user indicating the first attribute for the first bin and the second attribute for the second bin comprises:
creating a row that indicates the first attribute for the first bin and the second attribute for the second bin.

6. The system of claim 1, wherein creating a user record corresponding to the user indicating the first attribute for the first bin and the second attribute for the second bin comprises:
creating (1) a first set of one or more bit vector rows, wherein the first set of one or more bit vector rows together indicates the first attribute for the first bin and (2) a second set of one or more bit vector rows, wherein the second set of one or more bit vector rows together indicates the second attribute for the second bin.

7. The system of claim 1, wherein the user record corresponding to the user indicating the first attribute for the first bin and the second attribute for the second bin is input into the profiling technique.

8. The system of claim 1, wherein the operations comprise:
determining a first distribution of the feature from a first subset of the set of event data;
determining a second distribution of the feature from a second subset of the set of event data; and
determining the first value corresponding to the first bin and the second value corresponding to the second bin based on a similarity between the first distribution and the second distribution.

9. The system of claim 1, wherein creating a user record corresponding to the user indicating the first attribute for the first bin and the second attribute for the second bin comprises:
creating a set of one or more vectors that together indicate the first attribute for the first bin and the second attribute for the second bin.

10. A method, comprising:
receiving a set of event data that describe actions of users;
receiving a feature associated with a profiling technique, wherein the feature comprises a variable that represents a characteristic of users in the event data;
obtaining a set of bins that includes the first bin and the second bin;
determining that a numerical value for the feature for a particular user from the set of event data is greater than a first numerical value corresponding to the first bin, is less than a second numerical value corresponding to the second bin, and is not equal to any numerical value corresponding to any bin in the set of bins;
in response to determining that the numerical value of the feature is greater than the first numerical value corresponding to the first bin, is less than the second numerical value corresponding to the second bin, and is not equal to any numerical value corresponding to any bin in the set of bins, determining a first attribute that corresponds to an amount that the numerical value for the feature corresponds to the first numerical value and a second attribute that corresponds to an amount that the numerical value for the feature corresponds to the second numerical value; and
creating a user record corresponding to the user that indicates the first attribute for the first bin and the second attribute for the second bin.

11. The method of claim 10, wherein the set of event data comprises events with temporal aspects.

12. The method of claim 10, further comprising dynamically determining a number of attributes to be established for the feature.

13. The method of claim 10, wherein the feature is associated with a predetermined number of attributes.

14. The method of claim 10, wherein creating a user record corresponding to the user indicating the first attribute for the first bin and the second attribute for the second bin comprises:
creating a row that indicates the first attribute for the first bin and the second attribute for the second bin.

15. The method of claim 10, wherein creating a user record corresponding to the user indicating the first attribute for the first bin and the second attribute for the second bin comprises:
creating (1) a first set of one or more bit vector rows, wherein the first set of one or more bit vector rows together indicates the first attribute for the first bin and (2) a second set of one or more bit vector rows, wherein the second set of one or more bit vector rows together indicates the second attribute for the second bin.

16. The method of claim 10, wherein the user record corresponding to the user indicating presence in the first bin and the second bin is input into the profiling technique.

17. A non-transitory computer-readable medium storing software comprising instructions executable by one or more computers which, upon such execution, cause the one or more computers to perform operations comprising:

receiving a set of event data that describe actions of users;

receiving a feature associated with a profiling technique, wherein the feature comprises a variable that represents a characteristic of users in the event data;

obtaining a set of bins that includes the first bin and the second bin;

determining that a numerical value for the feature for a particular user from the set of event data is, greater than a first numerical value corresponding to the first bin, is less than a second numerical value corresponding to the second bin, and is not equal to any numerical value corresponding to any bin in the set of bins;

in response to determining that the numerical value of the feature is greater than the first numerical value corresponding to the first bin, is less than the second numerical value corresponding to the second bin, and is not equal to any numerical value corresponding to any bin in the set of bins, determining a first attribute that corresponds to an amount that the numerical value for the feature corresponds to the first numerical value and a second attribute that corresponds to an amount that the numerical value for the feature corresponds to the second numerical value; and creating a user record corresponding to the user that indicates the first attribute for the first bin and the second attribute for the second bin.

* * * * *

UNITED STATES PATENT AND TRADEMARK OFFICE
CERTIFICATE OF CORRECTION

PATENT NO. : 10,255,300 B1
APPLICATION NO. : 14/712498
DATED : April 9, 2019
INVENTOR(S) : Jhingran et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 486 days.

Signed and Sealed this
Tenth Day of December, 2019

Andrei Iancu
*Director of the United States Patent and Trademark Office*